(12) United States Patent
Marietta et al.

(10) Patent No.: US 8,560,782 B2
(45) Date of Patent: Oct. 15, 2013

(54) METHOD AND APPARATUS FOR DETERMINING ACCESS PERMISSIONS IN A PARTITIONED DATA PROCESSING SYSTEM

(75) Inventors: Bryan D. Marietta, Austin, TX (US); David B. Kramer, Cedar Park, TX (US); Gregory B. Shippen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 694 days.

(21) Appl. No.: 12/563,902

(22) Filed: Sep. 21, 2009

(65) Prior Publication Data

US 2011/0072220 A1    Mar. 24, 2011

(51) Int. Cl.
*G06F 12/00* (2006.01)

(52) U.S. Cl.
USPC ............ 711/153; 711/129; 711/170; 711/173

(58) Field of Classification Search
USPC .................. 711/129, 153, 170, 173, E12.001
See application file for complete search history.

(56) References Cited

U.S. PATENT DOCUMENTS

| | | | |
|---|---|---|---|
| 7,043,491 B1 * | 5/2006 | Gong | ................................... 1/1 |
| 7,386,637 B2 | 6/2008 | Arndt et al. | |
| 7,395,367 B2 | 7/2008 | Boyd et al. | |
| 7,398,328 B2 | 7/2008 | Arndt et al. | |
| 7,398,337 B2 | 7/2008 | Arndt et al. | |
| 2007/0168644 A1 | 7/2007 | Hummel et al. | |
| 2007/0208885 A1 | 9/2007 | Otsuka | |
| 2008/0147891 A1 | 6/2008 | Gregg | |
| 2008/0162865 A1 * | 7/2008 | Koufaty et al. | ............... 711/173 |
| 2008/0168186 A1 | 7/2008 | Gregg | |
| 2008/0168207 A1 | 7/2008 | Gregg | |
| 2008/0168208 A1 | 7/2008 | Gregg | |
| 2010/0228943 A1 | 9/2010 | Deshpande et al. | |
| 2010/0228945 A1 | 9/2010 | Deshpande et al. | |

* cited by examiner

*Primary Examiner* — Jasmine Song
(74) *Attorney, Agent, or Firm* — James L. Clingan, Jr.; Joanna G. Chiu

(57) ABSTRACT

In a data processing system having a plurality of resources and plurality of partitions, each partition including one or more resources of the plurality of resources, a method includes receiving an access request to a target resource of the plurality of resources; using a first set of transaction attributes of the access request to determine a partition identifier for the access request in which the partition identifier indicates a partition of the plurality of partitions which includes the target resource; using the partition identifier to determine access permissions for the partition indicated by the partition identifier; and based on the access permissions, determining whether or not the access request is permitted.

15 Claims, 3 Drawing Sheets

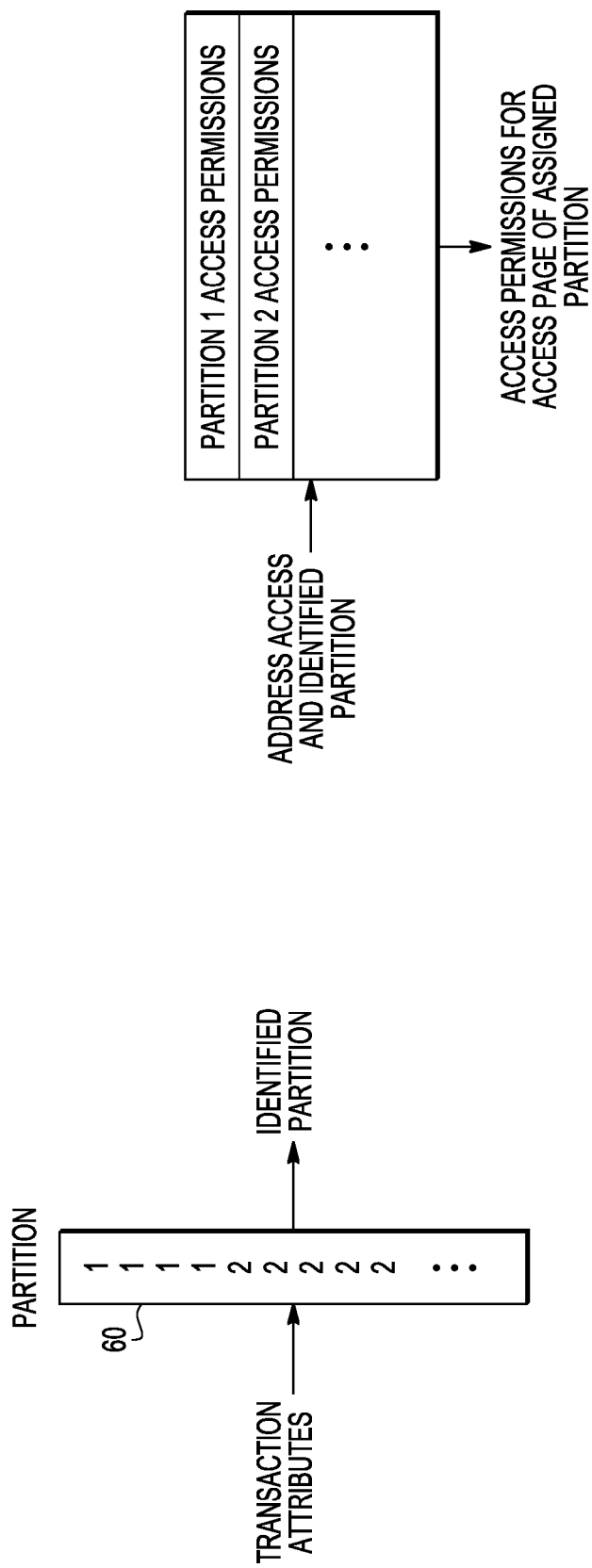

METHOD AND APPARATUS FOR DETERMINING ACCESS PERMISSIONS IN A PARTITIONED DATA PROCESSING SYSTEM

BACKGROUND

1. Field

This disclosure relates generally to data processing systems, and more specifically, to determining access permissions in a data processing system that employs more than one partition.

2. Related Art

Partitions in data processing systems are becoming increasingly common with the development of data processing systems. A partition typically contains a processor core and a number of specified resources or specified portions of a resource such as memory within the system. When an access request is received, it is necessary to determine which partition, if any, is to respond to the access request. For example, a request to access memory may arrive. Access permission is determined based on attributes associated with the request. The hardware associated with this process can be very significant.

Accordingly, there is a need for determining access permissions in a partitioned data processing system that improves upon one or more of the issues raised above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a block diagram of a portion of the embodiment of FIG. 1;

FIG. 3 is a block diagram of another portion of the embodiment of FIG. 1; and

DETAILED DESCRIPTION

A data processing system that has partitions and receives access requests, first determines to which partition the access request relates. It then identifies the attributes associated with the access request and the identified partition and applies the attributes to determine if the request will be applied or rejected. This is better understood by reference to the drawings and the following specification.

Figure 1:
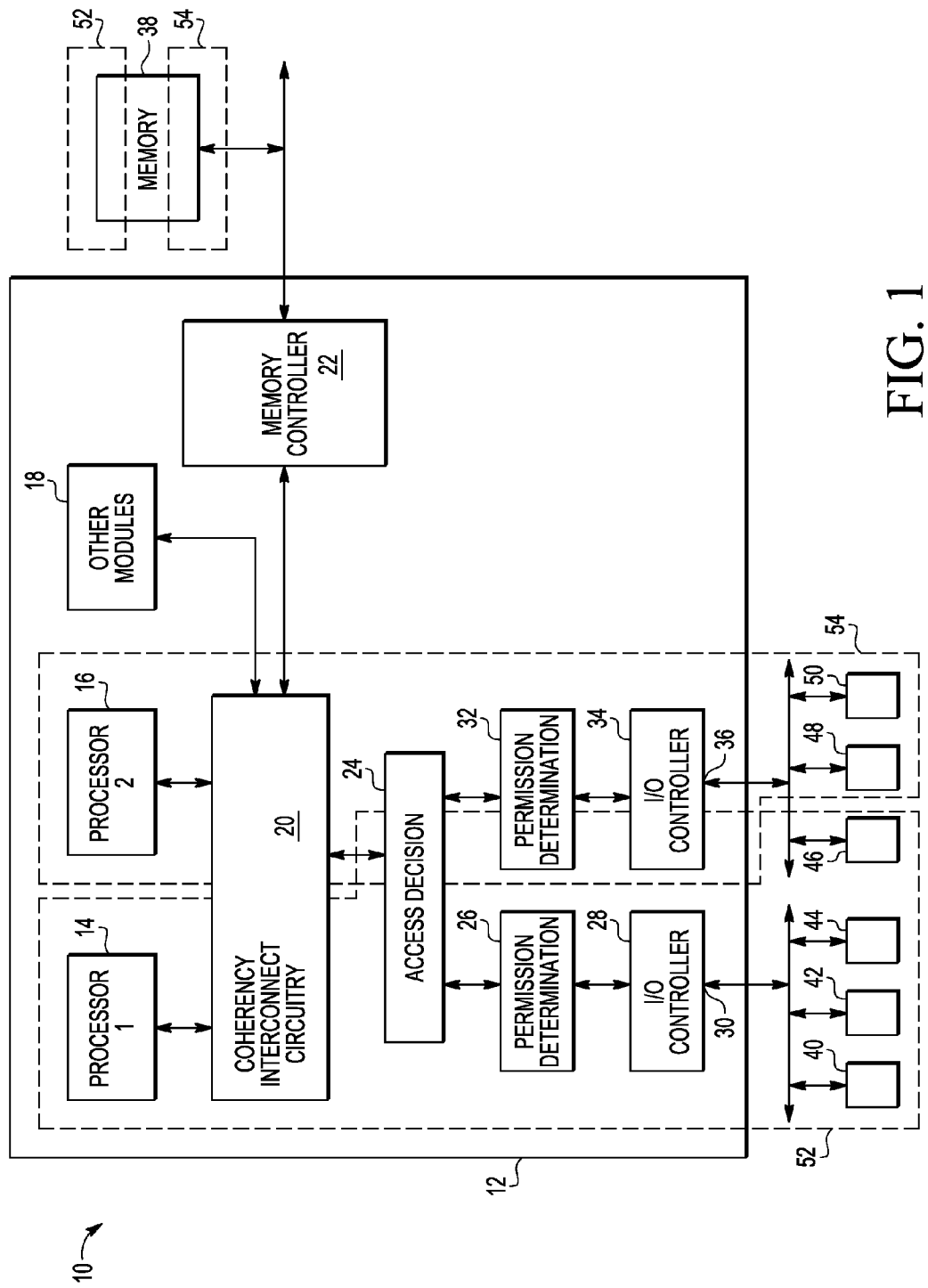
FIG. 1 is block diagram of a system according to an embodiment.

Shown in FIG. 1 is a system 10 comprising an integrated circuit 12 as well as resources external to integrated circuit 12. Integrated circuit 12 comprises processor 14, a processor 16, other modules 18, coherency interconnect circuitry 20, a memory controller 22, access decision circuitry 24, permissions determination circuitry 26, an I/O controller 28, an I/O 30, permissions determination circuitry 32, an I/O controller 34, and an I/O 36. Resources external to integrated circuit 12 include resources 40, 42, and 44 coupled to I/O 30, resources 46, 48, and 50 coupled to I/O 36, and a memory 38 coupled to memory controller 22. System 10 has a partition 52 and a partition 54, and may have other partitions not shown. Partition 52 comprises processor 14, permissions determination circuitry 26, I/O controller 28, I/O 30, and resources 40, 42, 44, and 46. Partition 54 comprises processor 16 and resources 48 and 50. Processor 14 is also identified as processor 1 as part of the first partition, partition 52. Similarly, processor 54 is also identified as processor 2 as part of second partition, partition 54. Access decision circuitry 24, permissions determination circuitry 32, I/O controller 34, and controller I/O are in and shared by both partition 52 and partition 54. The combination of I/O 36, I/O circuitry 34, permissions determination circuitry 32, and access decision circuitry 24 as a functional unit may be called partition access control circuitry.

Processor 14, processor 16, other modules 18, memory controller 22, and access decision circuitry are coupled to coherency interconnect circuitry 20. Coherency interconnect circuitry 20 performs the function of coordinating the various demands of the processors 52 and 54 with the available resources. Permissions determination circuitry 26 is coupled to access decision circuitry 24 and I/O controller 28. Permission determination circuitry is coupled to access decision circuitry 24 and I/O controller 34.

In operation, partitions 52 and 54 perform tasks independently of each other. Memory controller interfaces with memory 38 and coherency interconnect circuitry 20 to provide well organized accesses to memory 38 by partitions 52 and 54 in a manner well understood in the art. Memory 38 may be considered a shared resource for partitions 52 and 54, or memory 38 may be divided into sections in which a first specified section is part of partition 52 and a second specified section is identified as part of partition 54. In the described example as shown in FIG. 1, partition 52 includes the first specified section of memory 38, and partition 54 includes a second specified section of memory 38.

Shown in FIG. 2 is a table look-up circuit 60 that is part of I/O controller 34. Table look-up circuit 60 receives a transaction attribute signal that is a multi-bit signal that is a portion of the access request. Table look-up circuit 60 stores information that correlates the input to a partition. For each received input, which may be considered an index, there is an output that identifies a partition. Thus this look-up table is relatively small in that for each entry there is very small amount of information. The result is that the particular partition is identified in response to the access request. Thus, table look-up circuit 60 may be considered a partition identifier. Table look-up circuit 60 may also be considered a storage circuit.

Shown in FIG. 3 is a table look-up circuit 62 that is part of permissions determination circuit 32. Circuit receives the identified partition information an access address which is part of the access request. For each partition there is a relatively lengthy entry which provides permissions for each page that is possible for the partition. The access address identifies the page for the selected partition. The result is that the permissions are output for the identified partition and the page as identified by the access address. The size of look-up table is also relatively small because there are only a few entries, but each entry may have a significant amount of information. The combination of table look-up circuits 60 and 62 is far smaller than a single memory that had the number of entries of look-up table 60 and the amount of information per entry of table look-up circuit 62 coupled together. For example, a system with four partitions and 16 pages would consume 20 entries vs. 64 entries. Table look-up circuit 62 may also be considered a storage circuit.

Figure 4:
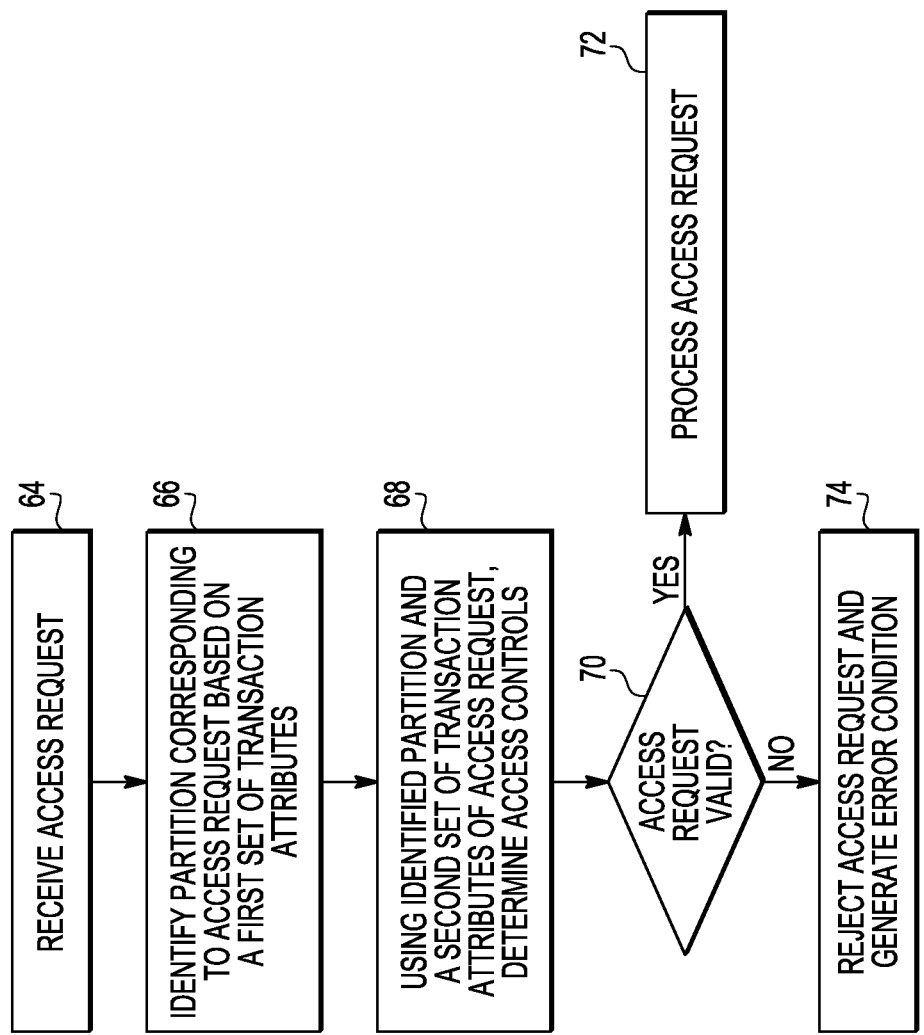
FIG. 4 is a flow chart according to a method of operating the system of FIG. 1.

Shown in FIG. 4 is a method of operating system 10. In a step 64 an access request is received at an I/O port. For example, the access request may be from resource 46, which is part of partition 52, and may target a resource such as memory 38. In the case of the access request being for accessing a memory location, at least a portion of the access request is an address. After receiving the access request, at a step 66 I/O controller 34 processes the access to obtain a first set of transaction attributes of the access request and then uses the first set of transaction attributes to identify the partition corresponding to the access request. In this example partition 52, the first partition, should be the partition identified because resource 46 is in partition 52 as determined by the attributes associated with this partition entry. This identification is achieved using look-up table 60 of FIG. 2. Shown in a step 68, access permissions of the access request are determined using the identified partition and a second set of transaction attributes obtained from the access request. In the case of the access request being a memory access, the second set of attributes would normally be the address of the location in memory for which access is being requested. The permissions for the access request are determined by using table look-up circuit 62 of FIG. 3. In step 70, the permissions that are determined in step 68 are used in determining if the access request is valid. If so, as shown in step 72, the access request is processed. If not, as shown in step 74, the access request is rejected and an error condition that may be called an access permission violation is generated by access decision circuitry 24.

Dividing the task of identifying the partition and determining access permissions into two distinct steps results in a reduction in the amount of storage space while also providing the benefit of allowing a port to be shared by two different partitions. Dedicating the ports to a single partition simplifies the process of identifying the partition but loses flexibility in optimizing partitions. In the described embodiment, both small circuit size and flexible partitions are obtained.

By now it should be appreciated that there has been provided a method in a data processing system having a plurality of resources and plurality of partitions, each partition including one or more resources of the plurality of resources. The method includes receiving an access request to a target resource of the plurality of resources. The method includes using a first set of transaction attributes of the access request to determine a partition identifier for the access request, the partition identifier indicating a partition of the plurality of partitions which includes the target resource. The method includes using the partition identifier to determine access permissions for the partition indicated by the partition identifier. The method includes based on the access permissions, determining whether or not the access request is permitted. The method may have a further characterization by which the using the first set of transaction attributes of the access request to determine the partition identifier for the access request comprises using a device identifier of a device which provided the access request. The method may have a further characterization by which the using the partition identifier to determine access permissions comprises using the partition identifier and a second set of transaction attributes to determine the access permissions. The method may have a further characterization by which the using the partition identifier and the second set of transaction attributes to determine the access permissions comprises using the partition identifier and an access address of the access request to determine the access permissions. The method may have a further characterization by which the data processing system further comprises an input/output (I/O) port, and may further comprise prior to the receiving the access request, storing a partition identifier corresponding to each device coupled to the I/O port of the data processing system in a first table. The method may have a further characterization by which the using the first set of transaction attributes of the access request to determine the partition identifier for the access request comprises using the first set of transaction attributes to access the first table to determine the partition identifier for the access request. The method may have a further characterization by which a plurality of devices are coupled to the I/O port, and wherein the storing the partition identifier corresponding to each device coupled to the I/O port in the first table comprises storing a first partition identifier corresponding to a first device of the plurality of devices in the first table and storing a second partition identifier corresponding to the second device of the plurality of devices in the first table, wherein each of the first partition identifier and the second partition identifier indicates a different partition of the plurality of partitions. The method may further comprise prior to the receiving the access request, storing access permissions corresponding to each partition of the plurality of partitions in a second table. The method may have a further characterization by which the using the partition identifier to determine the access permissions for the partition indicated by the partition identifier comprises using the partition identifier to access the second table to determine the access permissions for the partition indicated by the partition identifier.

Also described is a partitioned data processing system. The data processing system includes interconnect circuitry. The data processing system further includes a processor coupled to the interconnect circuitry. The data processing system further includes a plurality of resources coupled to the interconnect circuitry, wherein each partition of the partitioned data processing system includes a set of the plurality of resources. The data processing system further includes an input/output (I/O) port. The data processing system further includes partition access control circuitry coupled between the I/O port and the interconnect circuitry, wherein the partition access control circuitry, in response to receiving an access request from the I/O port to a target resource of the plurality of resources, determines a partition identifier for the access request based on a first set of transaction attributes of the access request wherein the partition identifier indicates a partition of the partitioned data processing system which includes the target resource, uses the partition identifier to determine access permissions for the partition indicated by the partition identifier, and uses the access permissions to determine whether or not the access request is permitted. The data processing system may further comprise storage circuitry which stores a partition identifier corresponding to each device coupled to the I/O port of the partitioned data processing system. The data processing system may further comprise second storage circuitry which stores access permissions corresponding to each partition of the partitioned data processing system. The data processing system may have a further characterization by which the first set of transaction attributes comprises a device identifier of a device coupled to the I/O port which provided the access request. The data processing system may have a further characterization by which the partition access control circuitry uses a second set of transaction attributes of the access request in addition to the partition identifier to determine the access permissions for the partition indicated by the partition identifier. The data processing system may have a further characterization by which wherein the second set of transaction attributes comprises an access address of the access request. The data processing system may further comprise a first external device coupled to the I/O port, wherein a first partition includes the first external device; and a second external device coupled to the I/O port, wherein a second partition, different from the first partition, includes the second external device.

Described also is a method In a data processing system having a plurality of resources and a plurality of partitions, each partition of the plurality of partitions including one or more resources of the plurality of resources. The data processing system includes receiving an access request from an external device to an access address of a target resource of the plurality of resources. The data processing system further includes using a source identifier of the external device to determine a partition identifier for the access request, the partition identifier indicating a partition of the plurality of partitions which includes the target resource. The data processing system further includes using the partition identifier and the access address of the access request to determine access permissions for the partition indicated by the partition identifier. The data processing system further includes, based on the access permissions, determining whether or not the access request is permitted. The data processing system may further comprise prior to the receiving the access request, storing a partition identifier corresponding to each device coupled to the I/O port of the data processing system in a first table; and, prior to the receiving the access request, storing access permissions corresponding to each partition of the plurality of partitions in a second table. The data processing system may further comprise, when the access request is permitted, applying an access request policy to perform the access request; and, when the access request is not permitted, rejecting the access request and generating an access permission violation. The data processing system may be further characterized by which the I/O port is further characterized as a Peripheral Component Interconnect (PCI) port.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, other architectures than that shown in FIG. 1 may be effective. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. In a data processing system having a plurality of resources and plurality of partitions, each partition including one or more resources of the plurality of resources, a method comprising:
    receiving an access request to a target resource of the plurality of resources;
    using a first set of transaction attributes of the access request to determine a partition identifier for the access request, the partition identifier indicating a partition of the plurality of partitions which includes the target resource, wherein each partition comprises a processor core and a group of resources;
    using the partition identifier to determine access permissions for the partition indicated by the partition identifier; and
    based on the access permissions, determining whether or not the access request is permitted;
    wherein the data processing system further comprises an input/output (I/O) port, the method further comprising:
    prior to the receiving the access request, storing a partition identifier corresponding to each device coupled to the I/O port of the data processing system in a first table; and prior to the receiving the access request, storing access permissions corresponding to each partition of the plurality of partitions in a second table.

2. The method of claim 1, wherein the using the first set of transaction attributes of the access request to determine the partition identifier for the access request comprises using a device identifier of a device which provided the access request.

3. The method of claim 1, wherein the using the partition identifier to determine access permissions comprises using the partition identifier and a second set of transaction attributes to determine the access permissions.

4. The method of claim 3, wherein the using the partition identifier and the second set of transaction attributes to determine the access permissions comprises using the partition identifier and an access address of the access request to determine the access permissions.

5. The method of claim 1, wherein the using the first set of transaction attributes of the access request to determine the partition identifier for the access request comprises using the first set of transaction attributes to access the first table to determine the partition identifier for the access request.

6. The method of claim 1, wherein a plurality of devices are coupled to the I/O port, and wherein the storing the partition identifier corresponding to each device coupled to the I/O port in the first table comprises storing a first partition identifier corresponding to a first device of the plurality of devices in the first table and storing a second partition identifier corresponding to the second device of the plurality of devices in the first table, wherein each of the first partition identifier and the second partition identifier indicates a different partition of the plurality of partitions.

7. The method of claim 1, wherein the using the partition identifier to determine the access permissions for the partition indicated by the partition identifier comprises using the partition identifier to access the second table to determine the access permissions for the partition indicated by the partition identifier.

8. A partitioned data processing system comprising:
    interconnect circuitry;
    a processor coupled to the interconnect circuitry;

a plurality of resources coupled to the interconnect circuitry, wherein each partition of the partitioned data processing system includes a processor core and a set of the plurality of resources;

an input/output (I/O) port;

partition access control circuitry coupled between the I/O port and the interconnect circuitry, wherein the partition access control circuitry, in response to receiving an access request from the I/O port to a target resource of the plurality of resources, determines a partition identifier for the access request based on a first set of transaction attributes of the access request wherein the partition identifier indicates a partition of the partitioned data processing system which includes the target resource, uses the partition identifier to determine access permissions for the partition indicated by the partition identifier, and uses the access permissions to determine whether or not the access request is permitted;

wherein storage circuitry which stores a partition identifier corresponding to each device coupled to the I/O port of the partitioned data processing system; and wherein second storage circuitry which stores access permissions corresponding to each partition of the partitioned data processing system.

9. The partitioned data processing system of claim 8, wherein the first set of transaction attributes comprises a device identifier of a device coupled to the I/O port which provided the access request.

10. The partitioned data processing system of claim 8, wherein the partition access control circuitry uses a second set of transaction attributes of the access request in addition to the partition identifier to determine the access permissions for the partition indicated by the partition identifier.

11. The partitioned data processing system of claim 10, wherein the second set of transaction attributes comprises an access address of the access request.

12. The partitioned data processing system of claim 8, further comprising:

a first external device coupled to the I/O port, wherein a first partition includes the first external device; and a second external device coupled to the I/O port, wherein a second partition, different from the first partition, includes the second external device.

13. The partitioned data processing system of claim 12, wherein the I/O port is further characterized as a Peripheral Component Interconnect (PCI) port.

14. In a data processing system having a plurality of resources and a plurality of partitions, each partition of the plurality of partitions including a processor core and one or more resources of the plurality of resources, a method comprising:

receiving an access request from an external device to an access address of a target resource of the plurality of resources;

using a source identifier of the external device to determine a partition identifier for the access request, the partition identifier indicating a partition of the plurality of partitions which includes the target resource;

using the partition identifier and the access address of the access request to determine access permissions for the partition indicated by the partition identifier; and based on the access permissions, determining whether or not the access request is permitted;

wherein the data processing system further comprises an input/output (I/O) port, the method further comprising: prior to the receiving the access request, storing a partition identifier corresponding to each device coupled to the I/O port of the data processing system in a first table; and prior to the receiving the access request, storing access permissions corresponding to each partition of the plurality of partitions in a second table.

15. The method of claim 14, further comprising:

when the access request is permitted, applying an access request policy to perform the access request; and when the access request is not permitted, rejecting the access request and generating an access permission violation.

* * * * *